United States Patent
Fitterer et al.

(10) Patent No.: US 9,098,560 B2
(45) Date of Patent: Aug. 4, 2015

(54) CLIENT MESSAGE DISTRIBUTION IN A DISTRIBUTED DIRECTORY BASED ON LANGUAGE AND CHARACTER SETS

(75) Inventors: Annemarie R. Fitterer, Austin, TX (US); Ramakrishna J. Gorthi, Pune (IN); Chandrajit G. Joshi, Pune (IN); Romil J. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 12/644,122

(22) Filed: Dec. 22, 2009

(65) Prior Publication Data

US 2011/0153717 A1    Jun. 23, 2011

(51) Int. Cl.
*G06F 15/16* (2006.01)
*G06F 17/30* (2006.01)

(52) U.S. Cl.
CPC ...... *G06F 17/30575* (2013.01); *G06F 17/3056* (2013.01); *G06F 17/30404* (2013.01)

(58) Field of Classification Search
CPC . G06F 17/2217; G06F 9/4448; G06F 17/275; G06F 17/30575; G06F 17/30404; G06F 17/3056
USPC .......................................................... 709/203
See application file for complete search history.

(56) References Cited

U.S. PATENT DOCUMENTS

| | | | |
|---|---|---|---|
| 5,497,319 A * | 3/1996 | Chong et al. | 704/2 |
| 5,778,213 A * | 7/1998 | Shakib et al. | 703/27 |
| 6,882,708 B1 * | 4/2005 | Bedingfield et al. | 379/88.18 |
| 7,132,962 B1 * | 11/2006 | Degenhardt et al. | 341/50 |
| 7,218,252 B2 * | 5/2007 | Fauque | 341/50 |
| 2004/0049483 A1 | 3/2004 | Dewilde | |
| 2004/0181776 A1 * | 9/2004 | Atkin et al. | 717/111 |
| 2007/0115488 A1 * | 5/2007 | Engelman et al. | 358/1.13 |
| 2007/0192444 A1 | 8/2007 | Ackaouy | |
| 2008/0300863 A1 * | 12/2008 | Smith | 704/9 |
| 2009/0089232 A1 | 4/2009 | Baier | |
| 2009/0132230 A1 * | 5/2009 | Kanevsky et al. | 704/2 |

OTHER PUBLICATIONS

Hodes, TD. et al.; 1999; Composable Ad Hoc Location-Based Services For Heterogeneous Mobile Clients;ACM Digital Library, pp. 1-17.

* cited by examiner

*Primary Examiner* — John MacIlwinen
(74) *Attorney, Agent, or Firm* — Francis Lammes; Stephen J. Walder, Jr.; Parashos T. Kalaitzis

(57) ABSTRACT

A proxy server distributes client messages to backend servers based on language. An incoming client message to the proxy server specifies a language to use for queries and other transactions with the backend servers. The proxy server determines a backend server that supports the language and transmits the client message to that backend server. A client message might specify a character set as well for interacting with the backend servers that support languages under a given character set.

14 Claims, 4 Drawing Sheets

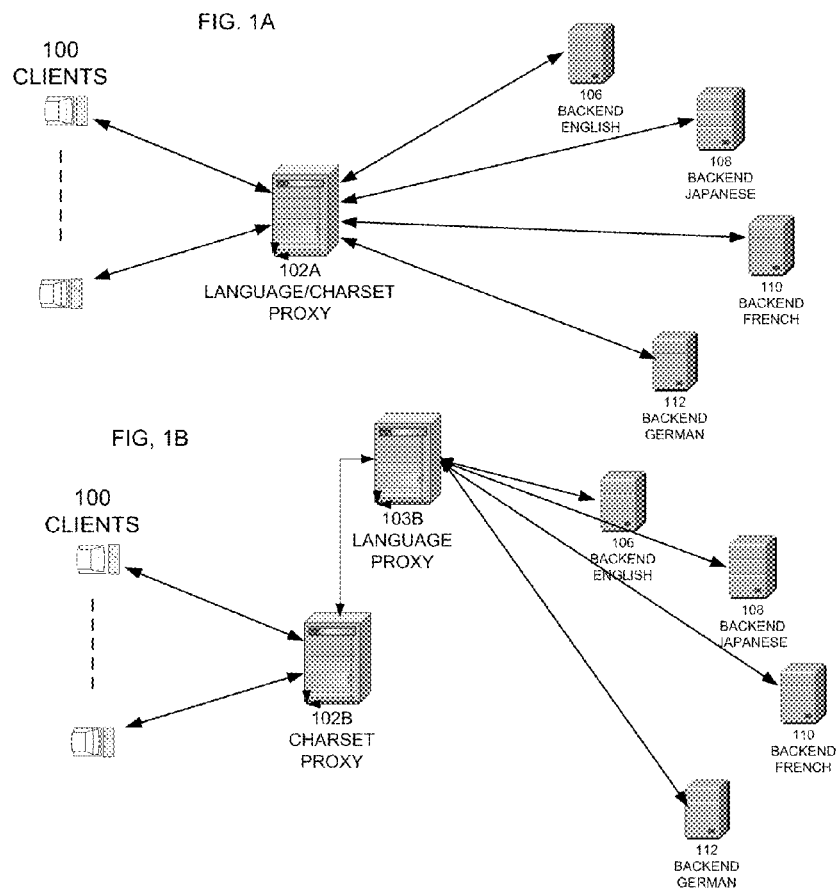
FIG. 2A - BACKEND SERVER LANGUAGE MAP
| ENGLISH | 106 |
|---|---|
| JAPANESE | 108 |
| RUSSIAN | 110 |
| GERMAN | 112 |
FIG. 2B - CHARSET- LANGUAGE MAP
| ASCII | ENGLISH | 106 |
|---|---|---|
| UTF-8 | ENGLISH | 108 |
|  |  |  |
|  |  |  |
| ASCII | GERMAN | 110 |
| UTF-8 | GERMAN | 112 |
FIG. 3 - LDAP PROTOCOL REQUEST
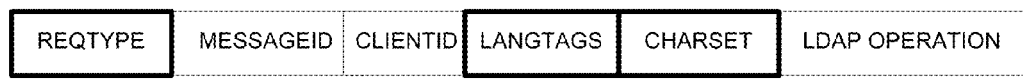

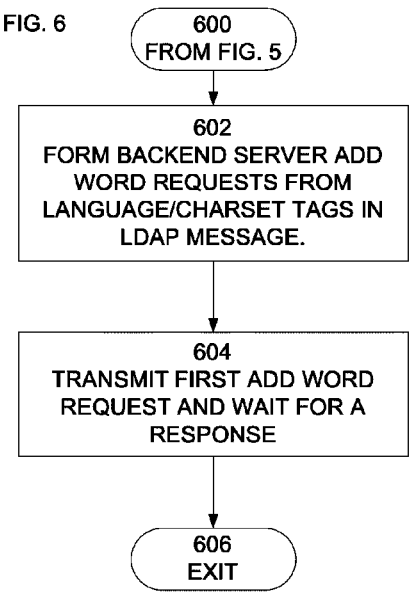
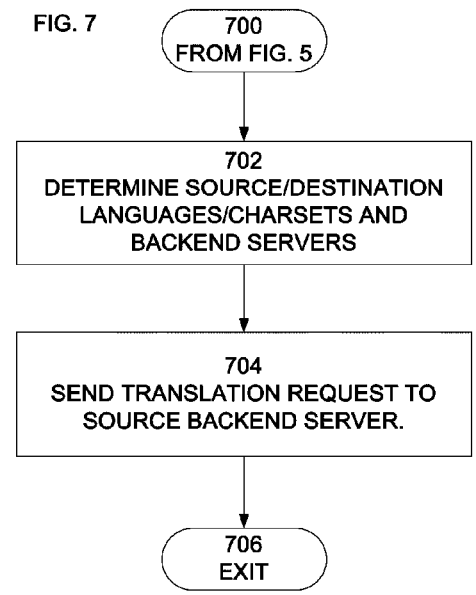
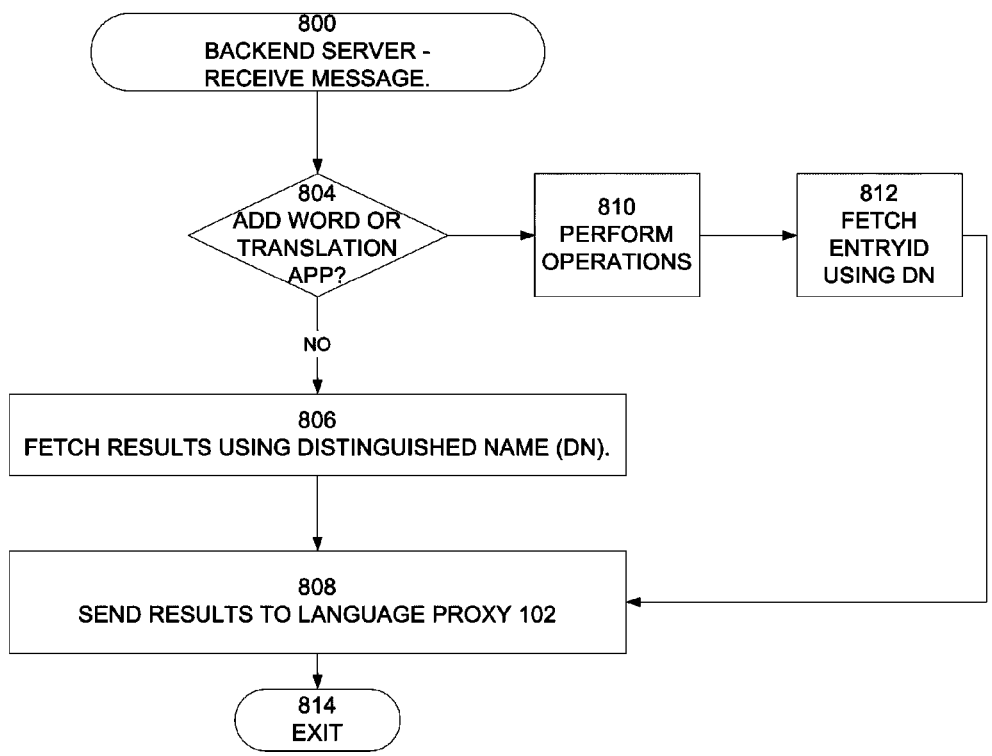

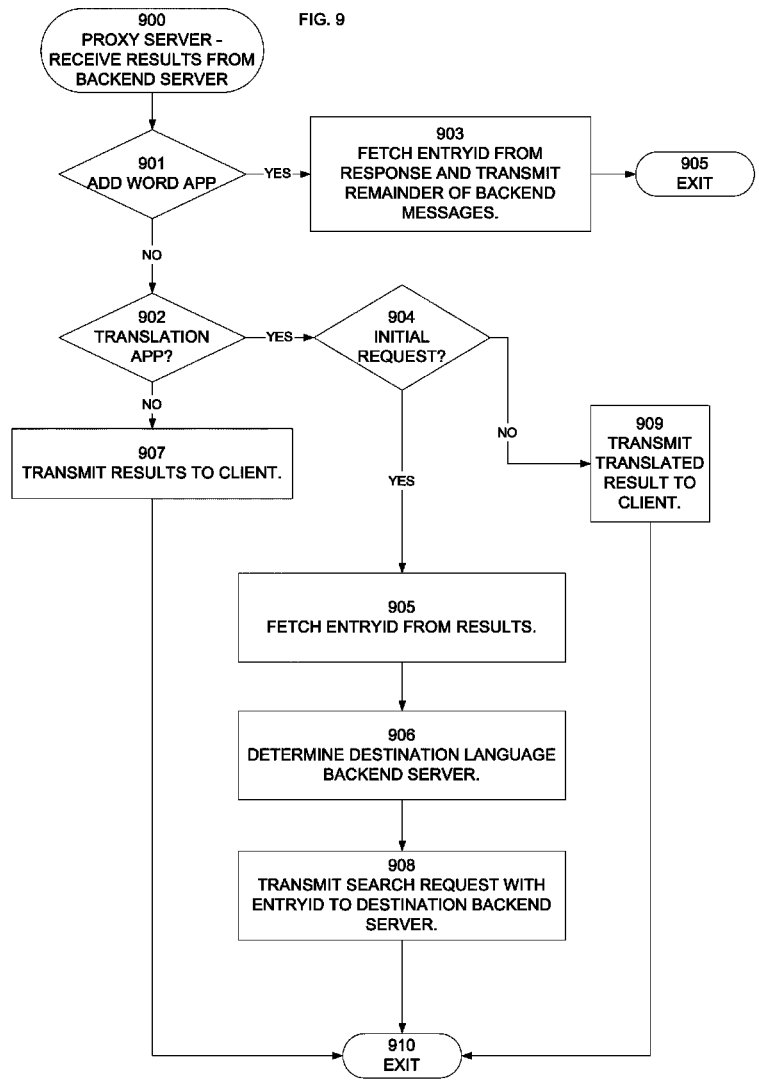

CLIENT MESSAGE DISTRIBUTION IN A DISTRIBUTED DIRECTORY BASED ON LANGUAGE AND CHARACTER SETS

BACKGROUND OF THE INVENTION

This invention is related generally to the fields of networking, computing, and databases, and specifically to the distribution of data or operation requests to backend servers based on languages and character sets. The disclosure uses LDAP (Lightweight Data Access Protocol) as an example. However, the principles of the specification can be extended to other data structures and protocols. The disclosed, illustrative embodiment is designed to execute on a computer such as a desktop, a workstation, a laptop or general-purpose mainframe, although alternative embodiments such as special-purpose electronics are possible. LDAP is an open industry standard defining a method for accessing and updating information in a directory. A directory server is an implementation of the LDAP protocol. It is basically a read-centric repository, wherein users can store any kind of data such as names and addresses, applications, files, printers, network resources etc. Data is stored in the directory servers in the form of tree entries.

BRIEF SUMMARY OF THE INVENTION

In one embodiment of the invention, a computer program product controls a proxy server to distribute client messages to backend servers based on language. The computer program product comprises program code for determining from an incoming client message what language to use. This embodiment also contains program code for determining a backend server that supports the language; and program code for transmitting the client message to the backend server that supports the language.

A second embodiment concerns a method for controlling a proxy server to distribute client messages to backend servers based on language. The method determines from an incoming client message what language to use. The method determines a backend server that supports the language and transmits the client message to that backend server.

In a third embodiment, a proxy server distributes client messages to backend servers based on language. The proxy server contains program code configured to determine from an incoming client message what language to use; program code configured to determine a backend server that supports the language; and program code configured to transmit the client message to the backend server that supports the language.

A fourth embodiment is a system comprising client workstations, a proxy server and a plurality of backend servers. The proxy server is configured to receive a client request message containing an identification of a desired language for the operation and also for the response to the client request message. The proxy server transmits the client request to a backend server based on the desired language. Additional embodiments of the invention provide the capabilities to distribute messages to backend servers based on desired character sets, to add words in different languages to appropriate ones of the backend servers and to translate words from one language to another.

BRIEF DESCRIPTION OF THE SEVERAL VIEWS OF THE DRAWINGS

In the drawings,

FIGS. 1A and 1B shows an illustrative networked system comprising client workstations, backend servers and a proxy server for distributing message requests from the workstations to backend servers; FIG. 1A shows a proxy server that handles both language requests and character set requests; FIG. 1B separates the language and character set proxies;

FIG. 2A shows an illustrative format of a backend server language map maintained at a language proxy server;

FIG. 2B shows an illustrative format of a character set-language map maintained at a charset proxy server;

FIG. 3 shows an illustrative format of a message from a client workstation, wherein the fields LANGTAGS and CHARSET specify what languages and potentially what character set to use in processing at a backend server;

FIGS. 5 through 7 show steps that a proxy server might use to distribute messages to backend servers;

FIG. 8 shows illustrative steps that a backend server might perform in response to receipt of a message from a proxy server; and FIG. 9 shows illustrative steps that a proxy server might perform in response to a response message from a backend server.

DETAILED DESCRIPTION OF THE INVENTION

Figure 4:
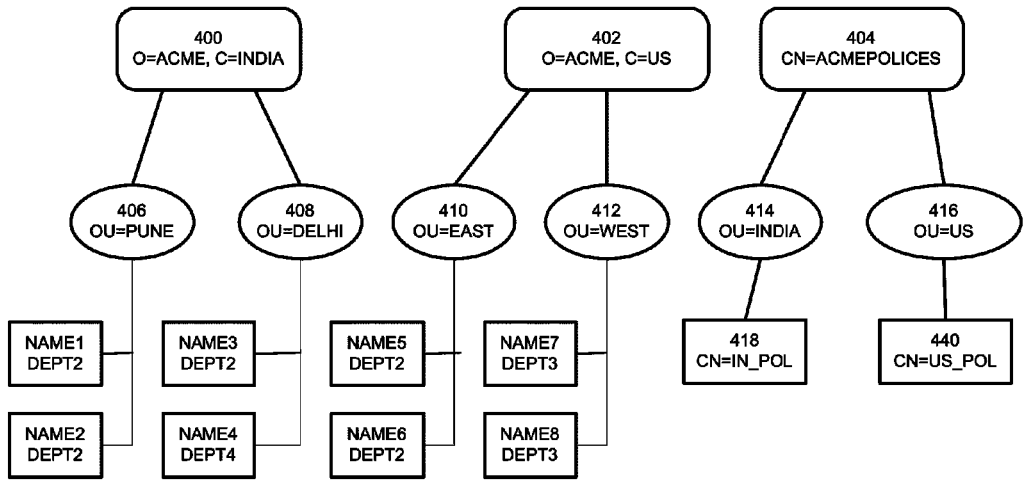
FIG. 4 shows a diagram of an illustrative LDAP database used as an aid in describing the invention herein.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the designer's computer, partly on the designer's computer, as a stand-alone software package, partly on the designer's computer and partly on a remote computer or entirely on the remote computer or server. In the latter scenario, the remote computer may be connected to the designer's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is shown a networked system for distributing messages in an LDAP system that is arranged according to one embodiment of the invention. Clients 100 send message requests to a centralized proxy 102A that is arranged to distribute the messages to backend servers 106, 108, 110 and 112 according to the languages and/or the character sets desired by users at clients 100. The backend servers are programmed to respond to requests in the languages they support. For example, server 106 supports the English language. Severs 108, 110 and 112 support Japanese, French and German languages, respectively.

Proxy 102A contains a backend server language map that is shown in FIG. 2A. As shown in FIG. 2A the map identifies which server supports what language. Proxy 102A also contains a character set/language map shown in FIG. 2B. By way of example, FIG. 2B shows that backend server 106 supports the ASCII character set, while backend server 112 supports the unicode character set UTF-8. Clearly, any given backend server might be equipped to support more that one language and more than one character set.

FIG. 1A shows an embodiment in which the proxy server 102 combines both features of language selection and character set selection in a client request. In an alternative embodiment the language proxy server and the charset proxy server are separated as shown in FIG. 1B. In this alternative embodiment, Clients 100 communicate with a charset proxy 102B and charset proxy 102B communicates with a language proxy 103B. The language proxy communicates with the backend servers. Certainly, the roles of charset proxy 102B and language proxy server 103B can be reversed if desired. These proxies can reside on the same physical computer, or they might reside in separate computers. The charset proxy server 102B brings about better organization of the back-end servers. There can be more than one of each type of proxy in FIGS. 1A and 1B and a configuration can support all combinations of proxies. All the languages that conform to a given character set will be administered by a relevant character proxy server. This charset proxy server is essentially an extension of the language proxy server. The charset proxy server would distribute data on the basis of character sets, rather than languages per se. So, the incoming requests would be monitored for the charset and based upon the charset, the relevant proxy server is picked up for serving that request.

FIG. 3 shows an illustrative format of an LDAP message as modified to support embodiments of the invention. Fields added to support embodiments of the invention are outlined in bold. In one embodiment, requests from a client and responses can specify the language involved for an otherwise conventional query. In another embodiment, a request might be for a translation of a word from one language into another language, or a request to add words to backend servers. A REQTYPE field identifies whether a specific language is to be used for a query, whether words are to be added or whether a word translation is requested. A field LANGTAGS identifies a single language when REQTYPE only requires a single language for the processing of an LDAP operation. However, LANGTAGS can identify a number of languages for certain operations such as when a word translation is requested. The CHARSET field is used to identify a desired character set that the proxy server will use to select a backend server to process the client request. The CHARSET proxy further identifies the appropriate LANGUAGE based upon the LANGUAGE controls passed in the request. In addition, conventional fields shown in FIG. 3 identify the requesting client 100 and specify a unique message identity for the requesting client and an LDAP operation.

FIG. 4 shows an example of a database for a fictitious company Acme Corp. as an aid in describing the invention. Acme has offices in Pune and Delhi, India and offices on the East and West coast of the U.S.A. Database tree beginning with node 400 contains employee entries (employee name and department number) for India. Node 406 contains employee entries for Pune and node 408 contains entries for Delhi. Beginning node 402 contains similar employee names and department numbers for the U.S.A. offices. The tree beginning at node 404 contains corporate policy documents. Because the corporate policies are different between India and the U.S.A branches, separate documents are in the tree at leaf nodes 418 (document IN_POL) and 420 (document US_POL). In FIG. 4, the following attributes are standard in LDAP and have the following meanings: O=Organization, C=Country, OU=Organizational Unit, CN=Common Name. In FIG. 4, the top-level entry at 400 defines an LDAP Distinguished Name (DN) as the attribute O=ACME, C=INDIA. Child entries 406 and 408 define the attributes "OU=PUNE" AND "OU=DELHI", respectively. The child nodes of nodes 406 and 408 contain the names of employees at the respective Organizational Unit and their department numbers. Similarly, top-level node 402 and its children define the organizational units on the East and West coast of the U.S.A. and their respective employees and department numbers. Top-level entry 404 contains the attribute "CN=ACMEPOLICIES".

Figure 5:
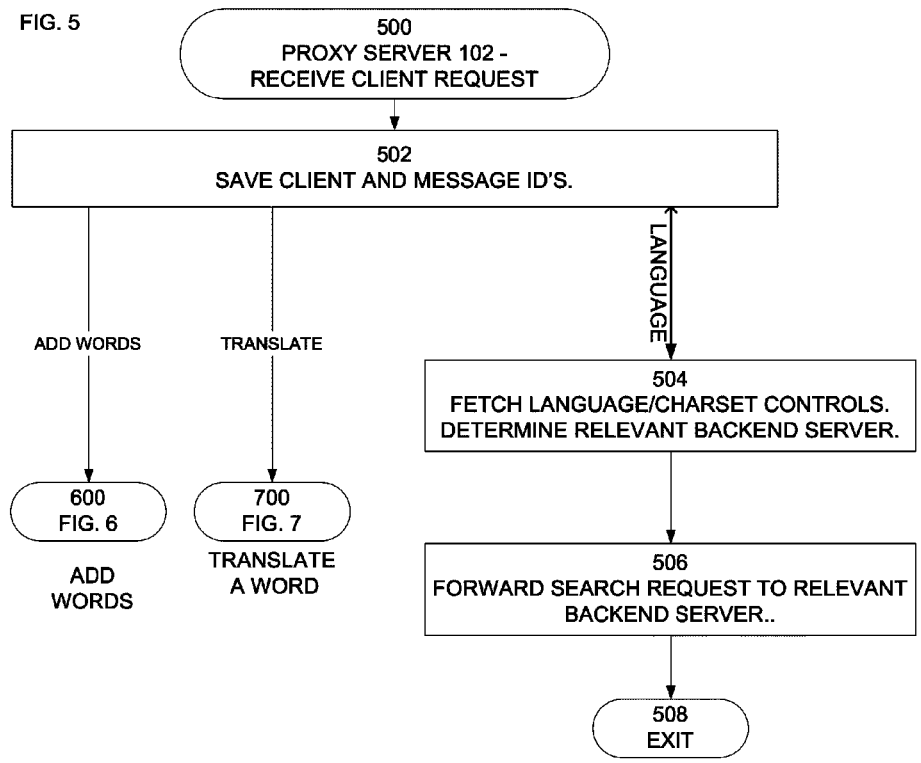

FIG. 5 shows an illustrative flowchart of steps that are performed at a proxy 102 in response to a request message from a client 100. All data in the message, and in fact in all messages received, are converted to UTF-8 before operating on them and sending to the backend servers. The request arrives at entry point 500. Step 502 saves the client identity and message identity from the request for later use. If REQ-TYPE indicates that the message contains a single language request, step 504 is executed. This is the beginning of a search request in a particular language. The overall search and read steps in the network are:

Read Request:
 a. Client sends a search request to the language proxy, along with the language control.
 b. The search base is converted to UTF-8 before sending it to the language proxy.
 c. The language proxy deciphers the Language Control to understand the back-end server it is supposed to target.
 d. The request is forwarded to the relevant back-end server. At that back-end server:
 e. The base DN would be converted back to the relevant locale and the search results would be fetched.
 f. The search results would be converted back to UTF-8 and sent back to the language proxy.
 g. The language proxy server would send the results to the client.
 h. At the client, the data would be converted back from UTF-8 to the local code page before dumping the content to the console.

With reference again to FIG. 5, step 504 at proxy 102 fetches the language and character set controls from the back-end server language map (FIG. 2) and the character set control if present (FIG. 3) and it determines a relevant backend sever to process the client request. Step 506 builds a search request message and sends the message to the selected backend server that supports the language specified and the character set if a character set is specified. This part of proxy 102 operation for the incoming request is now complete and terminated at 508.

If at 502, it is determined that the incoming message contains a request to add one or more dictionary words to the backend servers, step 502 transfers to 600 shown in FIG. 6. If step 502 determines that a simple word language translation is requested, it transfers to 700 shown in FIG. 7.

Referring to FIG. 6, to serve a request to add words to backend servers, proxy 102 at step 602 builds request messages to add words to the backend servers using the language and character set information in the language controls of FIGS. 2 and 3. The overall system steps required are summarized as follows:

Add Word Request at Step 602 of FIG. 6:
A client 100 sends an example add request to the language proxy for an entry with all the language tags as follows:
 a. ldapadd -D cn=root -w secret
 b. dn: cn=word1,o=ibm,c=us
 c. objectclass: word
 d. meaning; English: word
 e. meaning; French: <translated form of word, in French>
 f. meaning; Japanese: <translated form of word, in Japanese> where ldapadd specifies an add operation, -D cn=root identifies the distinguished name cn=root to bind to the LDAP directory and -w identifies a password, which in this case is "secret. The three "meaning" tags identify three languages English, French and Japanese and the translations of the word in the respective languages.

All data in the input is converted to UTF-8 before sending it across.

The attribute names remain the way they are.

When this data reaches the language proxy server:
 The language proxy server understands that it's a write request.
 The language proxy server sees that there are 3 language tags.
 The proxy server forms three different entries out of the above, as below:
  a. dn: UTF-8 format of "cn=word1,o=ibm,c=us"
   objectclass: word
   meaning: word
   entryID: "NULL"
  b. dn: UTF-8 format of "cn=word1,o=ibm,c=us"
   objectclass: word
   meaning: UTF-8 format of French translation of word
  c. dn: UTF-8 format of "cn=word1,o=ibm,c=us"
   objectclass: word
   meaning: UTF-8 format of Japanese translation of word
 The language proxy server remembers that the first entry is for the English server, second is for the French server and third is for the Japanese server.
 The language proxy sends the first entry to the English server at step 604. When the backend server adds the new word to its directory, it assigns a unique entryID to the word and returns the entryID. to proxy 102.
 The back-end English server returns the entryID of the entry, using the response control. The processing of the entryID by the language proxy is shown in detain in FIG. 9. The goal is to add the word translations to the other backend servers using the same entryID.
 If say the returned entryID is 23, the proxy server (at step 903 of FIG. 9) updates the other two saved entries with the same entryID as:
  a. dn: UTF-8 format of "cn=word1,o=ibm,c=us"
   objectclass: word
   meaning: UTF-8 format of French translation of word
   entryID: 23
  b. dn: UTF-8 format of "cn=word1,o=ibm,c=us"
   objectclass: word
   meaning: UTF-8 format of Japanese translation of word
   entryID: 23

Proxy 102 will then complete the processing of adding the word translations for the French and Japanese backend servers. This process is described in detail in FIG. 9 when proxy 102 receives the response from the backend English server.

FIG. 7 shows process steps executed by proxy 102 when step 502 determines that a client request for a word translation has been received. In such a case, additional overall system steps are required. In case of a dictionary search, a source and a target language are known; for example a user might want to know the German equivalent of a given English word.

The above steps in paragraphs 26 through 34 would be executed on the English back-end server to fetch the entryID.

This entryID would be used as a key to pull out data for the server running in German. The value pulled out of the German server would be returned back to the client.

With reference to FIG. 7, Step 702 determines from the incoming message the source word to be translated, its language and the backend server that contains the source word. Step 702 also determines the destination backend server that contains the desired translation of the source word using the language map of FIG. 2.

FIG. 8 shows illustrative steps that are taken at a backend server in response to the receipt of a message from proxy 102. When the backend server receives the message it first determines at step 804 if the request is for a word translation or an add word request. If neither, then step 806 uses the distinguished name (DN) in the message to perform a query on the datastore directory. The query results are obtained and returned to proxy 102 at step 808. The backend operations are then terminated at 814. If at 804 it is determined that a translation or add word message has arrived, step 810 performs the requested operation, either adding a word or retrieving a word. In either event, step 812 retrieves the entryID that is associated or has been assigned to the word and returns the entryID to proxy 102 at step 808.

FIG. 9 shows steps that might be performed at proxy 102 when it receives a response from a backend server. Step 901 determines if the response is to an add word request. If yes, then step 903 uses the entryID from the response message to add to the remaining saved add word messages for the remaining backend servers and transmits those messages to the respective backend servers as follows:

At steps 901 and 903, the proxy server completes the building of add messages for the remaining backend servers, including the entryID. For example, if the returned entryID is 23, the proxy server updates the other two saved entries as follows:
 a. dn: UTF-8 format of "cn=word1,o=ibm,c=us"
 b. objectclass: word
 c. meaning: UTF-8 format of French translation of word
 d. entryID: 23
 e. dn: UTF-8 format of "cn=word1,o=ibm,c=us"
 f. objectclass: word
 g. meaning: UTF-8 format of Japanese translation of word
 h. entryID: 23
and transmits the messages to the respective backend servers. In this way the entryIDs remain identical in all backend servers.

If this is not an add word application, step 902 determines if this is a translation application. If yes, step 904 determines if the received message is a response to the initial message from proxy 102 to a source language backend server. If yes, then it remains to receive the translated word from the language destination server. In this event, step 905 retrieves the entryID from the response message and steps 906 and 908 transmit a message to the destination server to retrieve the correct translation of the source word using the entryID. If the answer at 904 is negative, then the received message is from the destination server and contains the desired translation of the source word. The received translated word is transmitted to the client 100 at step 909. Proxy 102 ceases operation on this transaction at step 910. If the answer at step 902 is negative, the message from the backend server is the response to a conventional query, except that it is in the requested language and potentially in a requested character set as well. In this event, the results are formatted and transmitted to the client at step 907.

Having thus described the invention of the present application in detail and by reference to preferred embodiments thereof, it will be apparent that modifications and variations are possible without departing from the scope of the invention defined in the appended claims.

What is claimed is:

1. A computer program product comprising a non-transitory computer readable storage medium having computer usable program code embodied therein for controlling a proxy server to distribute client messages to backend servers based on a language character set identified in an incoming client message, wherein the computer usable program code, when executed on a data processing system, causes the data processing system device to:
 determine whether the incoming client message contains a write request to add a word in different specified languages to a directory of respective one of one or more backend servers that support the different specified languages;
 convert the incoming client message to a unicode character set;
 build a write message for each respective one or more servers, each write message containing a word translation in the language supported by each of the one or more backend servers;
 transmit a first one of the write messages to a first one of the one or more backend servers;
 receive a unique entry identifier (entryID) from the first one of the one or more backend servers, the unique entryID identifying the directory word addition; and
 add the unique entryID to each of the remaining write messages before sending the write request to their respective one or more servers.

2. The computer program product of claim 1, wherein the computer usable program code further causes the data processing system to:
 transmit the incoming client message to a backend server that supports the desired language.

3. The computer program product of claim 2, wherein the computer usable program code further causes the data processing system to:
 request from the backend server a translation of a word from one language to another language.

4. The computer program product of claim 1, wherein the computer usable program code is configured to operate using the Lightweight Directory Access Protocol (LDAP) and wherein the incoming client message contains a field identifying a type of request and a field identifying a desired character set to be used to serve the type of request.

5. The computer program product of claim 1, wherein the computer usable program code are downloaded over a network from a remote data processing system.

6. The computer program product of claim 1, wherein the computer usable program code are downloaded over a network to a remote data processing system for use in a computer readable storage medium with the remote system.

7. A method for distributing client messages to backend servers based on language character sets, comprising:
 receiving an incoming client message,
 determining whether the incoming client message contains a write request to add a word in different specified languages to a directory of respective one of one or more backend servers that support the different specified languages;
 converting the message to a unicode character set;
 building a write message for each respective one or more servers, each write message containing a word translation in the language supported by each of the one or more backend servers;

transmitting a first one of the write messages to a first one of the one or more backend servers;

receiving a unique entry identifier (entryID) from the first one of the one or more backend servers, the unique entryID identifying the directory word addition; and adding the unique entryID) to each of the remaining write messages before sending the write request to their respective one or more servers.

8. The method of claim 7, further comprising:

transmitting the incoming client message to a backend server that supports the desired language.

9. The method of claim 8, further comprising:

requesting from the backend server a translation of a word from one language to another language.

10. The method of claim 7, wherein the incoming client message contains a field identifying a type of request and a field identifying a desired character set to be used to serve the type of request.

11. A proxy serve for distributing client messages to backend servers based on language character sets, comprising:

a processor; and a memory coupled to the processor, wherein the memory comprises instructions which, when executed by the processor, cause the processor to:

determine whether the incoming client message contains a write request to add a word in different specified languages to a directory of respective one of one or more backend servers that support the different specified languages;

convert the incoming client message to a unicode character set;

build a write message for each respective one or more servers, each write message containing a word translation in the language supported by each of the one or more backend servers;

transmit a first one of the write messages to a first one of the one or more backend servers; and receive a unique entry identifier (entryID) from the first one of the one or more backend servers, the unique entryID identifying the directory word addition; and add the unique entryID to each of the remaining write messages before sending the write request to their respective one more servers.

12. The proxy server of claim 11, wherein the instructions further cause the processor to:

transmit the incoming client message to a backend server that supports the desired language.

13. The proxy server of claim 12, wherein the instructions further cause the processor to:

request from the backend server a translation of a word from one language to another language.

14. The proxy server of claim 11, wherein the incoming client message contains a field identifying a type of request and a field identifying a desired character set to be used to serve the type of request.

* * * * *